Jan. 25, 1927.

J. W. JULICH

LAND AND WATER AUTO

Filed May 12, 1926    3 Sheets-Sheet 1

1,615,389

J. W. Julich, INVENTOR

BY Victor J. Evans, ATTORNEY

WITNESS:

Jan. 25, 1927.
J. W. JULICH
1,615,389
LAND AND WATER AUTO
Filed May 12, 1926   3 Sheets-Sheet 2
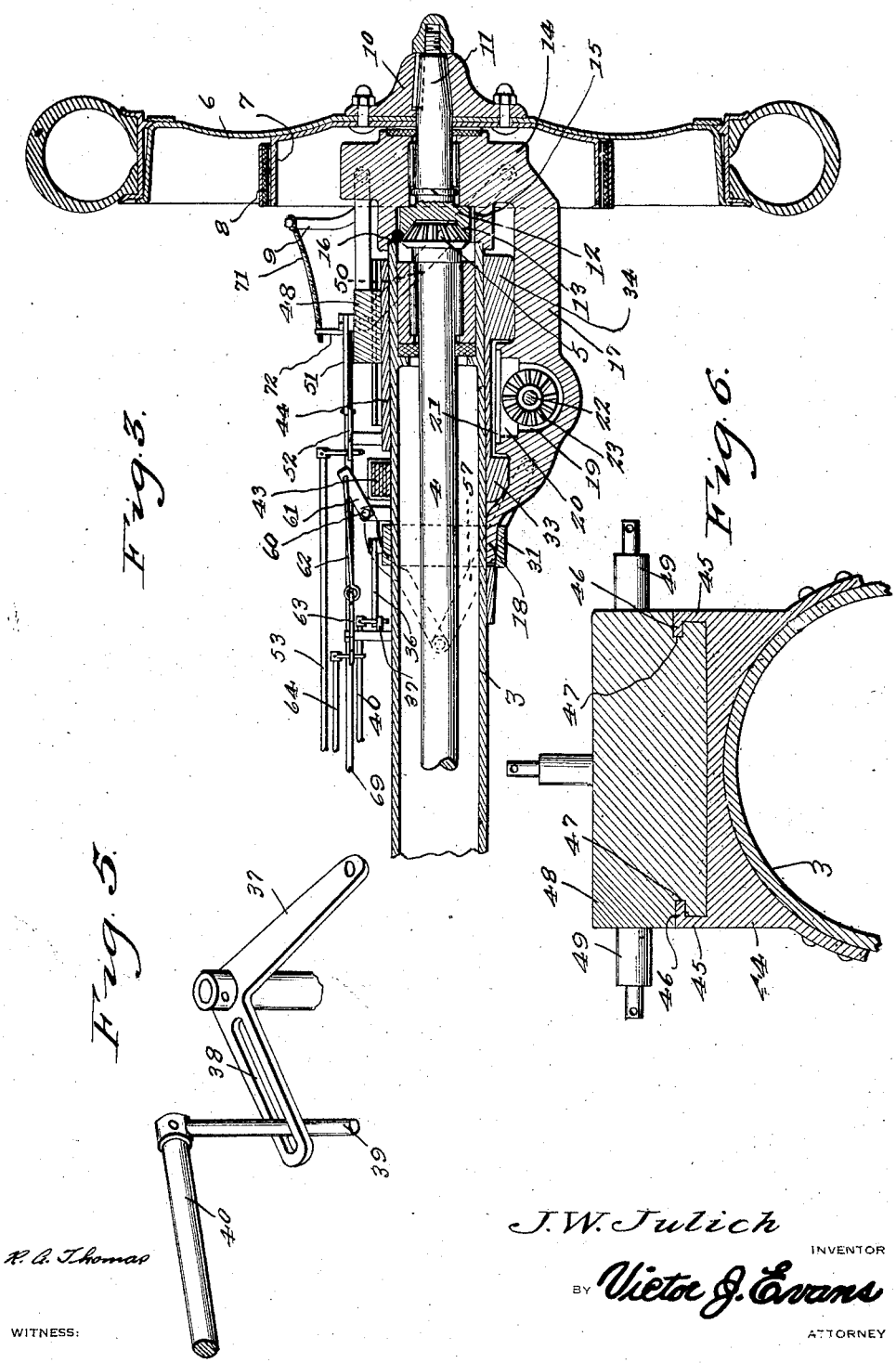
J. W. Julich
INVENTOR
BY Victor J. Evans
ATTORNEY Jan. 25, 1927.
J. W. JULICH
1,615,389
LAND AND WATER AUTO
Filed May 12. 1926
3 Sheets-Sheet 3
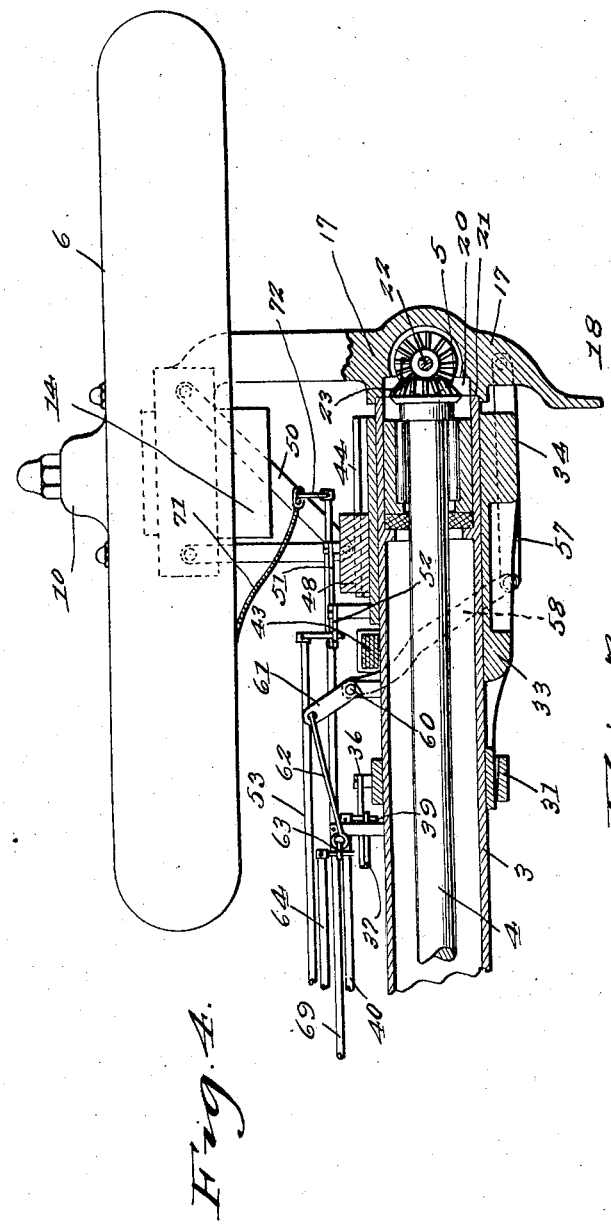

Patented Jan. 25, 1927.

1,615,389

UNITED STATES PATENT OFFICE.

JAKOB W. JULICH, OF TULSA, OKLAHOMA.

LAND AND WATER AUTO.

Application filed May 12, 1926. Serial No. 108,612.

My present invention has reference to a motor driven vehicle and my object is the provision of a vehicle of this character which may be successfully driven on either land or water.

A further object is the provision of a motor driven vehicle in which the rear or traction wheels are driven by the rear axle shafts but which are swingable over the rear axle housing to arrange screw propellers in positions to be revolved by the rear axle shafts, and whereby the vehicle may be successfully employed either on land or water.

A further object is the provision of means for converting a motor driven vehicle into a water craft of such construction and arrangement of parts that the same may be, with only comparatively slight changes, arranged upon any ordinary type of automobiles or the like.

To the attainment of the foregoing the invention consists in the improvement as hereinafter described and definitely claimed.

In the drawings:

Figure 3 is an enlarged fragmentary central vertical longitudinal section through the rear axle housing and the drive wheel, with the parts in position as illustrated in Figure 1.

Figure 4 is a similar sectional view with the parts arranged in the position disclosed in Figure 2, the drive wheel being in elevation.

Figure 5 is a fragmentary perspective view of the revoluble and swingable means for imparting a longitudinal movement to the slidable elements of the improvement.

Figure 6 is a fragmentary sectional view through the rear axle casing to more clearly illustrate the mounting of the slidable block thereon.

Figure 7 is a detail sectional view through the axle housing to illustrate the guide thereon for the rack bar as well as the support for the toothed end of the throw rod for the propeller shaft.

Figure 1:
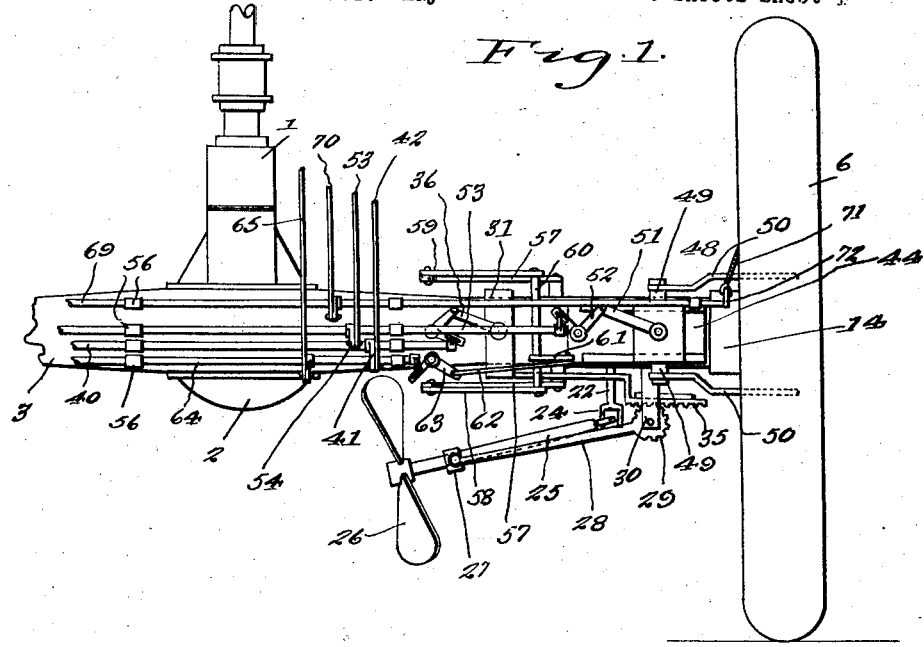
Figure 1 is a top plan view of a sufficient portion of the drive shaft tube, differential housing, rear axle shaft housing and one of the drive wheels of a motor driven vehicle to illustrate the application of my improvement thereon.

In the drawings, the numeral 1 designates the drive shaft tube of a motor driven vehicle, 2 the differential housing and 3 the rear axle housing. Only one of the rear axles 4 is illustrated by the drawings, but it is to be understood that both axles are similarly constructed and driven in the usual manner by the drive shaft. In the present instance, however, each axle 4 has fixedly mounted on its outer end a beveled pinion 5.

The drive wheel for the automobile or similar motor driven vehicle is of the disc type, and is indicated by the numeral 6 in the drawings. The drive wheel has on its inner face the usual brake drum 7 around which is arranged the usual brake band 8, and this brake band is compressed in the usual manner by the operation of a lever 9. The fixed hub on the wheel 6 is indicated by the numeral 10, and keyed in this hub there is an axle spindle 11. The spindle, on its inner end, is formed with a headed enlargement 12, the said head from its outer end being provided with a depression whose walls are arranged at an inward inclination and the said walls are toothed, as at 13. Thus the inner end of the head of the axle spindle is formed with what may be termed a female gear designed to receive therein and mesh with the teeth of the pinion 5.

The spindle 11 is journaled in a bearing opening in a casting which I refer to as a hub and which is designated by the numeral 14. The hub has an inner tubular extension 15 and the outer face of the said extension is grooved to provide the bore thereof with an annular depression 16 that provides a pocket in which is received the outer end of the rear axle housing 3. The hub 14, on its lower edge, is formed with an extension which I shall term an arm and which is indicated by the numeral 17. The arm has its outer end reduced to provide the inner face of the same with an extension 18 which I shall term a tail. The arm 17, inward of the tail, is formed with a pocket 19, and surrounding this pocket, and projecting outwardly from the straight inner face of the arm, there is an annular enlargement 20 formed at its outer end with an inner groove 21. The enlargement 20 is really in the nature of a hub as the same is designed to be arranged over the outer end of the housing 3, in a manner which will presently be apparent.

Journaled in bearing openings in the arm, in a line with the center of the pocket 19, there is a comparatively short shaft 22, and fixed on this shaft, and arranged in the pocket 19, there is a beveled pinion 23. The short shaft 22 has its outer end formed with a member 24 that provides one of the elements of a universal joint between the said short shaft and the shaft 25 on which is mounted the propeller blades 26. On the shaft 25 there is a slidable collar 27, and pivotally secured to this collar there is a rod 28 whose outer end is widened and is rounded and provided with peripheral teeth 29. The toothed end 29 of the rod 28 is pivotally supported in the bifurcated end of a lug 30 which is swaged on, formed with or otherwise fixedly secured to the housing 3.

The reduced or tail portion 18 of the arm 17 is normally engaged by a slidable sleeve 31 that is mounted for movement on the housing 3 but held from turning thereon. Preferably, the outer face of the tail 18 and the inner wall provided by the offset portion in the sleeve 31, are beveled in opposite directions, so that a wedging engagement is thus afforded between these elements. The housing 3 has also secured thereon a plate provided with depending lugs 33 and 34 which contact with the inner face of the arm 17 at the opposite sides of the annular enlargement 20 thereof, or if desired, the said arm may be provided with pockets for the reception of the said lugs. The lugs and the engagement of the slidable sleeve 31 with the tail of the arm, effectively lock the arm against the under face of the housing 3, and likewise hold the hub positioned so that the pinion 5 on the axle 4 will be in meshing engagement with the toothed end of the spindle 11 and consequently the wheel 6 will be revolved upon the turning of the axle 4.

Fixedly secured on one side of the sleeve 31, there is one end of an offset rack bar 35, the said rack bar being received in the bifurcation of the lug 30 and the teeth thereof in engagement with the toothed end 29 of the rod 28. Pivotally mounted on the sleeve 31 there is a link 36, and pivotally secured to this link there is one arm of a bell crank lever 37. The second arm of the bell crank lever is slotted, as at 38, and received through this slot there is a pin 39 on the end of a bar or shaft 40. The bar or shaft 40 has fixedly secured thereon a link 41, and to this link there is pivotally secured an operating rod 42. The operating rod leads into the body of the vehicle, (not shown). The body is of a watertight construction, and may be of any desired shape. The operating rod 42 will pass through a packing box in the lug and the said rod may be actuated by a suitable lever (not shown), which preferably has a pawl engagement with a suitable rack bar (not shown). It will be apparent that when a pull is exerted on the rod 42 the shaft 40 will turn and swing the bell crank lever to move the sleeve 31 off of the tail 18 of the arm, and such movement of the sleeve will draw on the rack bar 35 to turn the rod 28 and to swing the propeller shaft 25 in a line with the stub shaft 22.

The shafts which actuate the remaining sliding parts of the improvement are similar to the shaft 40, operated by levers in the same manner as the said shaft 40, and provided with fingers to engage in the slotted arms of the bell crank levers similar to that above described, so that a detail description of the revoluble and swingable actuating means for such sliding parts will not be referred to in detail.

The axle housing 3, outward of the slidable sleeve 31, has fixed thereon the supporting spring 43 by which the body of the vehicle is supported from the rear axle housing, and outward of the spring 43 there is fixed on the top of the axle shaft housing 3, a guide member 44. This member is in the nature of a block whose outer face is flat and whose sides are formed with extending flanges 45 formed with inturned ends 46. The ends 46 are received in grooves 47 in a slidable block 48 which rests on the top of the guide 44. The block 48 has its sides provided with trunnions 49 on whose ends there are journaled substantially V-shaped plates 50, and the arms of these plates have their outer ends secured to the respective opposite sides of the hub 14. On the top of the slidable block 48 there is pivotally secured a link 51 which in turn is pivotally secured to one arm of a bell crank lever 52, the second arm of the said lever being slotted and the said slot has passed therethrough a finger on the end of a bar or shaft 53. The bar or shaft 53 has fixed thereon a link or finger 54 to which is connected an operating rod 55 that, like the operating rod 42, enters the body of the vehicle and is actuated in a manner similar to that by which the rod 42 is moved. Of course, the rods or shafts 40 and 53 are journaled in suitable bearings 56 on the housing 3.

It will be apparent that the sliding of the block 48, will, through the medium of the angle or V-shaped arms 50, move the hub 14 and its arm 17, after the latter has been released by the sleeve 31, so that the spindle 11 is brought out of meshing engagement with the pinion 5, and likewise that the said hub will be moved off of the housing 3.

Figure 2:
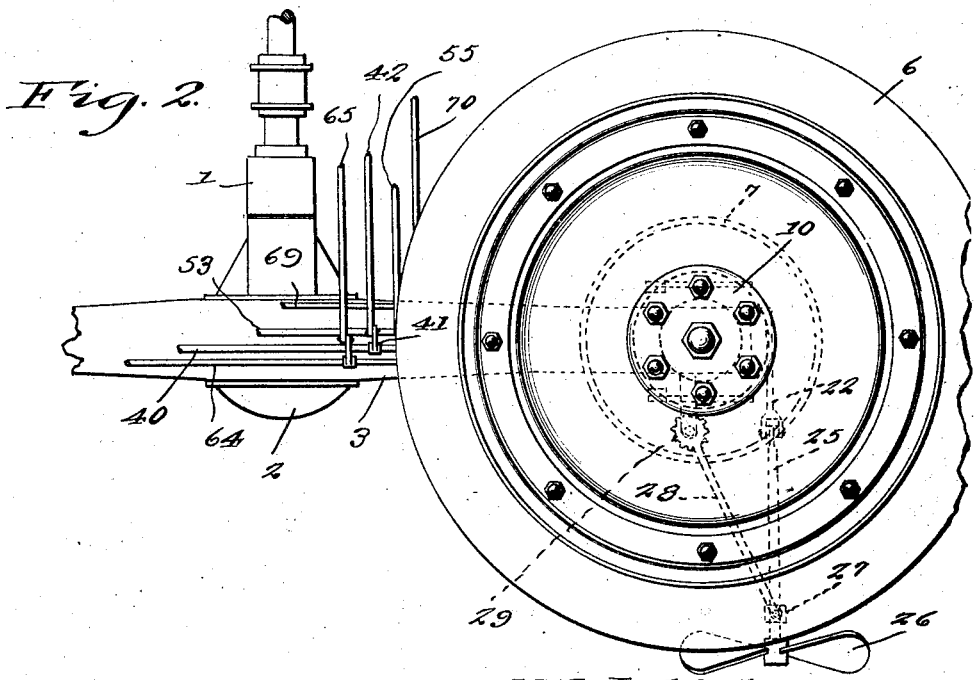
Figure 2 is a view similar to Figure 1 but showing the drive wheel swung over the rear axle housing and the propeller in a position to be operated by the turning of the rear axle shaft.

To swing the hub and the wheel carried thereby over the housing 3, I pivotally secure to the sides of the arm 17 links 57. These links have their outer ends pivotally connected to angularly disposed links 58. Other links 59 are pivotally connected to the ends of the links 58 and the free ends of these links 59 are secured and connected by a bar on shaft 60. Fixed on the bar or shaft there is a short link or finger 61 that has pivotally attached thereto a rod 62 which has its free end pivotally connected to one arm of a bell crank lever 63. The second arm of the bell crank lever is slotted and is engaged by a pin or finger on a rod or shaft 64 that is journaled in bearings similar to the bearings 56. On the shaft 64 there is fixed a short arm or finger to which is pivotally connected an operating rod 65, similar to the operating rods 42 and 55 and operated in the same manner. It will be apparent that by operating the rod 65 the connected levers 59 and 58 will swing the arm 17 and the hub 14 to the positions illustrated in Figures 2 and 4 of the drawings, the pivotal connection between the angle members 50 and the slidable block serving as a fulcrum for the hub 14. The hub on the arm is arranged opposite but, not in engagement with the end of the housing 3 so it is necessary to operate the rod 55 to move the slidable block 48 in a reverse direction to that which it previously took. This brings the hub on the arm in engagement with the end of the housing 3, and the pinion 23 in mesh with the pinion 5 on the axle shaft 4. When the parts are so arranged it will be obvious that the turning of the shaft 4 will revolve the universally connected shafts 22 and 25 to impart motion to the propellers 26.

The numeral 66 designates a rod or shaft which is journaled in bearings similar to the bearings 56 and which shaft has fixed thereon a link or finger to which is pivoted an operating rod 70. This rod is actuated in the same manner as the rods 42, 45 and 65. The rod or shaft 69 is designed to actuate the brake band 8, and the operating lever 9 for the said brake band has connected thereto a strong flexible element 71 which has its free end secured on an offset arm 72 on the rod or shaft 69. A turning of the shaft 69 will exert a pull on the element 71 to operate the brake lever 9 when the device is traveling on ground, and the flexible connection between the lever 9 and the shaft or rod 69 permits of the wheel being swung over the housing 3 without influencing the brake or the operating lever 9 therefor. When in ground engagement the flexible element 71 is drawn taut so that the brakes may be readily applied by the operation of the rod 70.

It is believed that my construction and the operation thereof will be perfectly apparent to those skilled in the art to which this invention relates when the foregoing description is carefully read in connection with the accompanying drawings. Manifestly the improvement is susceptible to various changes both in size and in details of construction, and it is therefore to be understood that the showing is merely illustrative and that I am entitled to make all such changes therefrom as fairly fall within the scope of what I claim.

Having described the invention, I claim:—

1. The combination with a drive axle of an automobile having a gear on its outer end, a housing for the axle and a drive wheel for the axle, of an axle spindle fixed to the drive wheel having a gear thereon for mesh with the axle gear, a bearing hub for the spindle receiving the end of the housing therein, an angle arm on the bearing hub, a propeller having its shaft journaled in the arm and a fixed pinion on the shaft arranged in the arm, releasable means for locking the arm against the housing, means for moving the hub and axle outward of the housing, and means for swinging the hub and wheel over the housing to bring the pinion in the arm in mesh with the pinion on the axle shaft.

2. The combination with a motor driven vehicle, of a wheel having a fixed axle spindle engageable with and revoluble by the drive shaft of the vehicle, a pivotally supported hub for the spindle, an angle arm on the hub, a propeller carrying shaft journaled therethrough, releasable means for locking the arm on the housing, means for moving the hub, spindle and wheel outwardly with respect to the housing, means for swinging the hub and wheel over the housing and to bring the propeller shaft in a line with the axle, and intermeshing means between said axle and said propeller shaft.

3. A motor propeller combined land and water vehicle, including wheels driven by the rear axle shafts of the vehicle, means for moving the wheels out of engagement with the axle shafts and for swinging the said wheels over said shaft, a propeller associated with the drive wheel, and designed to be brought into position for rotation by the axle shaft when the drive wheel has been moved to its last mentioned position.

4. The combination with the drive axles of an automobile having a gear on its outer end, a housing for the axle, and a drive wheel, of an axle spindle fixed on the drive wheel and having a gear for mesh with that on the drive axle, a hub in which the spindle is revolubly mounted and which normally engages with and closes the outer end of the housing, an angle arm on the hub, interengaging means between the arm and the housing, slidable means on the housing engageable with the arm for holding the latter in one position, operating means for the slidable means, a propeller, a shaft for the propeller having one end journaled through the arm, a pinion in the arm fixed on the shaft, a hub surrounding the pinion, a slidable block on the housing, members comprising angle arms pivoted to the sides of the block and to the sides of the first mentioned hub, means for sliding the block, pivoted cross links, one pair of said cross links being pivotally secured to the sides of the arm, a connecting element between the second pair of links, and means for swinging the links, all as and for the purpose set forth.

5. The combination with the drive axle of an automobile, having a gear on its outer end, a housing for the axle and a drive wheel; of an axle spindle fixed on the drive wheel and having a gear to mesh with the gear on the drive axle, a hub in which the spindle is revolubly mounted and which normally closes the outer end of the housing, an arm on the hub, slidable means holding the arm on the housing, a propeller having a shaft journaled in the arm, a gear on said shaft housed in the arm, means for swinging the drive wheel and the hub angularly with respect to the housing, whereby to bring the gear on the arm in mesh with the gear on the axle, and means for retaining the parts in such position.

6. The combination with the drive axle of an automobile, having a gear on its outer end, a housing for the axle and a drive wheel, of an axel spindle fixed on the drive wheel, a hub in which the spindle is revolubly mounted, an arm on the hub, slidable means for holding the arm in contacting engagement with the housing, a propeller wheel, a sectional axle therefor, the inner element of which being journaled in the arm, a gear on said element, a brace member slidably associated with the outer member of the propeller shaft and movable to bring the shaft sections into alignment when the movable arm holding means is moved to releasing position, and such movement of said means designed to swing the propeller to operative position, means for swinging the drive wheel angularly with respect to the housing, whereby to bring the gear on the arm in mesh with the gear on the shaft, and means for locking the elements in such position.

7. The combination with the drive axle of an automobile, having a gear on its outer end, a housing for the axle, and a drive wheel; of an axle spindle fixed on the drive wheel and having a gear normally in mesh with the gear on the drive axle, a hub in which the spindle is revolubly mounted, and which normally closes the outer end of the housing, an arm on the hub, slidable means for normally holding the arm in contacting engagement with the housing, a propeller having a shaft of universally connected members, one of which being journaled in the arm and having a gear thereon, a pivoted member providing a reinforcing guard for the shaft, means actuated by the movement of the slidable member for causing the reinforcing brace member to move upon its pivot and to bring the shaft sections into alignment, and to likewise bring the arm against the outer end of the housing to cause the gear thereon to mesh with the gear on the drive axle and means, movable prior to the last mentioned means for swinging the drive wheel angularly with respect to the housing.

8. The combination with the drive axle of an automobile having a gear on its outer end, a housing for the axle and a drive wheel propelled by said axle, of an axle spindle fixed to the drive wheel and having a gear in mesh with the gear on the drive axle, slidable means on the housing, elements associated therewith and engaging the hub for holding the same in operative position, a propeller, an arm on the hub, a propeller, a shaft for the propeller comprising universally connected members, one of which being journaled in the arm, a gear on the last mentioned shaft section, a slidable element on the outer shaft section, slidable means for holding the arm against the housing, means associated with said slidable means for swinging the shaft engaging means to bring the shaft sections into alignment, to likewise bring the gear on the shaft section into a position to mesh with the gear on the axle, slidable means for swinging the wheel over the housing prior to the action of the last mentioned means, and means for locking the parts in either of the mentioned positions.

9. The combination with the drive axle of an automobile, having a gear on its outer end, a housing for the axle and a drive wheel propelled by said axle, of an axle spindle fixed to the drive wheel and having a gear in mesh with the gear on the drive axle, slidable means on the housing, elements associated therewith and engaging the hub for holding the same in operative position, a propeller, an arm on the hub, a propeller, a shaft for the propeller, comprising universally connected members, one of which being journaled in the arm, a gear on the last mentioned shaft section, a slidable element on the outer shaft section, slidable means for holding the arm against the housing, means associated with said slidable means for swinging the shaft engaging means to bring the shaft sections into alignment, to likewise bring the gear on the shaft section into a position to mesh with the gear on the axle, slidable means for swinging the wheel over the housing prior to the action of the last mentioned means, means for locking the parts in either of the mentioned positions, a brake for the drive wheel, operating means therefor, and said means being releasable when the parts are brought to the last mentioned position.

In testimony whereof I affix my signature.

JAKOB W. JULICH.